United States Patent
Zhou et al.

(10) Patent No.: US 11,525,991 B2
(45) Date of Patent: Dec. 13, 2022

(54) PORTABLE QUANTITATIVE PHASE MICROSCOPE FOR MATERIAL METROLOGY AND BIOLOGICAL IMAGING

(71) Applicant: The Chinese University of Hong Kong, Hong Kong (CN)

(72) Inventors: Renjie Zhou, Hong Kong (CN); Mengxuan Niu, Hong Kong (CN); Gang Luo, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 268 days.

(21) Appl. No.: 16/917,216

(22) Filed: Jun. 30, 2020

(65) Prior Publication Data

US 2021/0063718 A1  Mar. 4, 2021

Related U.S. Application Data

(60) Provisional application No. 62/894,370, filed on Aug. 30, 2019.

(51) Int. Cl.
*G02B 21/36* (2006.01)
*G02B 21/14* (2006.01)
(Continued)

(52) U.S. Cl.
CPC ........... *G02B 21/14* (2013.01); *G02B 5/1866* (2013.01); *G02B 6/0006* (2013.01);
(Continued)

(58) Field of Classification Search
CPC .... G02B 21/14; G02B 5/1866; G02B 6/0006; G02B 6/0008; G02B 21/02; G02B 21/18;
(Continued)

(56) References Cited

U.S. PATENT DOCUMENTS

| | | | | |
|---|---|---|---|---|
| 8,248,614 B2 * | 8/2012 | Mann | ................. | G01B 9/02069 356/485 |
| 9,557,549 B2 * | 1/2017 | Yaqoob | ..................... | G01J 9/02 |
| 10,845,248 B1 * | 11/2020 | Cheng | ....................... | G01J 3/10 |

FOREIGN PATENT DOCUMENTS

KR    1020150087578 A  *  7/2015

OTHER PUBLICATIONS

Popescu, G., "Quantitative Phase Imaging of Cells and Tissues," *Biophotonics*, pp. 1-385, McGraw-Hill, 2011.
(Continued)

*Primary Examiner* — Arnel C Lavarias
(74) *Attorney, Agent, or Firm* — Saliwanchik, Lloyd & Eisenschenk

(57) ABSTRACT

A quantitative phase microscopy (QPM) system and methods are provided for sample imaging and metrology in both transmissive and reflective modes. The QPM system includes a first illuminating beam propagating along a transmission-mode path and a second illuminating beam propagating along a reflection-mode path, a microscope objective lens disposed in the reflection-mode path, and a common-path interferometer comprising a diffraction grating, a Fourier lens, a pinhole, and a 2f system lens to collimate the reference beam and the imaging beam such that the collimated reference beam and imaging beam interfere with each other to form an interferogram at a final image plane.

23 Claims, 18 Drawing Sheets

(51) Int. Cl.
| | |
|---|---|
| *G02B 21/02* | (2006.01) |
| *G02B 27/28* | (2006.01) |
| *G02B 27/42* | (2006.01) |
| *G02B 21/18* | (2006.01) |
| *F21V 8/00* | (2006.01) |
| *G02B 5/18* | (2006.01) |
| *G02B 27/30* | (2006.01) |

(52) U.S. Cl.
CPC ........... *G02B 6/0008* (2013.01); *G02B 21/02* (2013.01); *G02B 21/18* (2013.01); *G02B 21/36* (2013.01); *G02B 27/283* (2013.01); *G02B 27/286* (2013.01); *G02B 27/30* (2013.01); *G02B 27/425* (2013.01)

(58) Field of Classification Search
CPC .... G02B 21/36; G02B 27/283; G02B 27/486; G02B 27/30; G02B 27/425; G02B 21/00; G02B 21/0004; G02B 21/0052; G02B 21/0056; G02B 21/0068; G02B 21/008; G02B 21/06; G02B 21/088; G02B 21/361; G02B 27/4233; G01B 9/02; G01B 9/04; G01B 11/00; G01B 11/06; G01B 11/0641; G01B 11/0675; G01B 11/22; G01B 11/24; G01B 11/2441; G01B 11/30
USPC ....... 359/363, 362, 368, 369, 370, 371, 385, 359/386, 388; 356/450, 491, 492, 493, 356/494, 495, 499, 496, 498, 503, 505, 356/511, 512, 516, 521
See application file for complete search history.

(56) References Cited

OTHER PUBLICATIONS

Lee, K. et al., "Quantitative Phase Imaging Techniques for the Study of Cell Pathophysiology: From Principles to Applications," *Sensors*, 2013, 13:4170-4191.

Park, Y. et al., "Measurement of red blood cell mechanics during morphological changes," *PNAS*, Apr. 13, 2010, 15(107):6731-6736.

Bhaduri, B. et al., "Diffraction phase microscopy: principles and applications in materials and life sciences," *Advances in Optics and Photonics*, 2014, 6:57-119, OSA.

Edwards, C. et al., "Diffraction phase microscopy: monitoring nanoscale dynamics in materials science [Invited]," *Applied Optics*, Sep. 20, 2014, 53(27):33-43, Optical Society of America.

Zhou, R. et al., "Detecting 20 nm Wide Defects in Large Area Nanopatterns Using Optical Interferometric Microscopy," *Nano Letters*, 2013, 13:3716-3721, American Chemical Society.

Jafarfard, M. R. et al., "Dual-wavelength diffraction phase microscopy for simultaneous measurement of refractive index and thickness," *Optics Letters*, May 15, 2014, 39(10):2908-2911, Optical Society of America.

Popescu, G. et al., "Diffraction phase microscopy for quantifying cell structure and dynamics," *Optics Letters*, Mar. 15, 2006, 31(6):775-777, Optical Society of America.

Lee, K. et al., "Quantitative phase imaging unit," *Optics Letters*, Jun. 15, 2014, 39(12):3630-3633, Optical Society of America.

Pham, H. V. et al., "Fast phase reconstruction in white light diffraction phase microscopy," *Applied Optics*, Jan. 1, 2013, 52(1):97-101, Optical Society of America.

Edwards, C. et al., "Optically monitoring and controlling nanoscale topography during semiconductor etching," *Light: Science & Applications*, 2012, 1:1-7, CIOMP.

Park, Y. et al., "Metabolic remodeling of the human red blood cell membrane," *PNAS*, Jan. 26, 2010, 107(4):1289-1294.

Park, Y. et al., "Refractive index maps and membrane dynamics of human red blood cells parasitized by *Plasmodium falciparum*," *PNAS*, Sep. 16, 2008, 105(37):13730-13735, The National Academy of Sciences of the USA.

Jin, D. et al., "Large Population Cell Characterization Using Quantitative Phase Cytometer," *Cytometry Part A*, 2017, 91A:450-459, International Society of Advancement of Cytometry.

Majeed, H. et al., "Towards Automated Histopathology of Breast Cancer Using Spatial Light Interference Microscopy (SLIM)," *Modern Pathol*, 2016, 29:55A-56A.

\* cited by examiner

B

A

B

A

B

C

D

PORTABLE QUANTITATIVE PHASE MICROSCOPE FOR MATERIAL METROLOGY AND BIOLOGICAL IMAGING

CROSS-REFERENCE TO RELATED APPLICATION

This application claims the benefit of U.S. Provisional Application Ser. No. 62/894,370, filed Aug. 30, 2019, the disclosure of which is hereby incorporated by reference in its entirety, including all figures, tables and drawings.

BACKGROUND OF THE INVENTION

Due to its noninvasive and label-free nature, quantitative phase microscopy (QPM) has emerged as an important tool for material metrology and biomedical imaging, such as quantifying morphology and dynamics within cells and materials, cancer diagnostics, and profiling and inspecting material structures. However, due to its relatively high complexity and cost, QPM has not yet gained the critical mass to become a standard imaging instrument in research laboratories and industry. For a broader adoption, recently several compact and low-cost QPM methods have been developed for potentially imaging in extreme environments, resource limited clinical settings, and factories in industry. In most cases, those QPM systems still require an external microscope body and only work in one imaging mode, i.e., mostly in transmission mode for imaging transparent samples. On the other hand, less-free holography techniques have allowed for extreme portability on cell phone platforms, but complicated and time-consuming computation is required, while often quantitative phase values were not obtained.

BRIEF SUMMARY OF THE INVENTION

There continues to be a need in the art for improved designs and techniques for quantitative phase microscopy (QPM).

Embodiments of the subject invention pertain to quantitative phase microscopy for sample imaging and metrology in both transmissive and reflective modes.

According to an embodiment of the invention, a system for quantitative phase imaging can comprise an illuminating source for generating an illuminating beam; a fiber coupler having an input end coupled to the illuminating source to receive the illuminating beam, configured to provide a first illuminating beam to output from a first output end to propagate along a transmission-mode path and a second illuminating beam to output from a second output end to propagate along a reflection-mode path; a first linear polarizer disposed in the transmission-mode path to receive the first illuminating beam from the fiber coupler and configured to linearly polarize the first illuminating beam before illuminating a sample; a second linear polarizer disposed in the reflection-mode path to receive the second illuminating beam from the fiber coupler and configured to linearly polarize the second illuminating beam; a half-wave plate disposed in the reflection-mode path to receive the second illuminating beam from the second linear polarizer and configured to rotate the polarization of the second illuminating beam to 0 degree along a horizontal axis; a polarization beam splitter (PBS) disposed in the reflection-mode path to receive the second illuminating beam from the half-wave plate and configured to divide incident elliptically polarized light into orthogonally polarized beams such that the horizontally polarized second illuminating beam is fully directed to objective lens side; a quarter-wave plate disposed in the reflection-mode path to receive the second illuminating beam from the PBS and configured to rotate an imaging field polarization state by 90° along a vertical axis such that the second illuminating beam only goes along a right-hand side port of the PBS before forming an image; a microscope objective lens disposed in the reflection-mode path to receive the second illuminating beam from the PBS and configured to transmit the second illuminating beam to the sample and receive a third illuminating beam formed by the second illuminating beam reflected by the sample and the first illuminating beam transmitted through the sample for imaging; a tube lens disposed to receive the third illuminating beam from the PBS; a common-path interferometer system disposed to receive the third illuminating beam from the tube lens, the common-path interferometer system comprising a diffraction grating disposed in an intermediate image plane and configured to generate beams of multiple image orders, wherein a $0^{th}$ diffraction order beam is an imaging beam and a $1^{st}$ diffraction order beam is a reference beam; a Fourier lens disposed to receive both the $0^{th}$ diffraction order beam and the $1^{st}$ diffraction order beam and configured to focus them down by a predetermined focal length; a pinhole disposed in the Fourier plane to receive the $1^{st}$ order beam, configured to be a low-pass filter for the $1^{st}$ order beam; and a 2f system lens disposed to receive the imaging beam from the Fourier lens and the reference beam from the pinhole, to collimate the reference beam and the imaging beam such that the collimated reference beam and imaging beam interfere with each other to form an interferogram at a final image plane.

In another embodiment, a method for obtaining a quantitative phase image of a sample can comprise generating an illuminating beam by an illuminating source; splitting the illuminating beam, by a fiber coupler, into a first illuminating beam to propagate along a transmission-mode path and a second illuminating beam to propagate along a reflection-mode path; linearly polarizing the first illuminating beam by a first linear polarizer disposed in the transmission-mode path; linearly polarizing the second illuminating beam by a second linear polarizer disposed in the reflection-mode path; rotating the polarization of the second illuminating beam to 0 degree along a horizontal axis by a half-wave plate disposed in the reflection-mode path to receive the second illuminating beam from the second linear polarizer; splitting the second illuminating beam into polarized beams by a polarization beam splitter (PBS) disposed in the reflection-mode path to receive the second illuminating beam from the half-wave plate; rotating, by a quarter-wave plate, an imaging field polarization state by 90° along a vertical axis such that the second illuminating beam only goes along a right-hand side port of the PBS before forming an image, wherein the quarter-wave plate is disposed in the reflection-mode path to receive the second illuminating beam from the PBS and configured to; transmitting, a microscope objective lens, the second illuminating beam to the sample and receiving a third illuminating beam formed by the second illuminating beam reflected by the sample and the first illuminating beam transmitted through the sample for imaging, wherein the microscope objective lens is disposed in the reflection-mode path to receive the second illuminating beam from the PBS; receiving, by a tube lens, the third illuminating beam from the PBS; performing a common-path interferometry by generating beams of multiple image orders by a diffraction grating disposed in an intermediate image plane, wherein a $0^{th}$ diffraction order beam is configured to be an imaging beam and a 1st diffraction order beam is configured to be a reference beam; focusing, by a Fourier lens, both the 0th diffraction order beam and the 1st diffraction order beam down by a predetermined focal length; low-pass filtering for the 1st order beam by a pinhole disposed in the Fourier plane; and collimating, by a 2f system lens, the reference beam and the imaging beam such that the collimated reference beam and imaging beam interfere with each other to form an interferogram at a final image plane, the 2f system lens being disposed to receive the imaging beam from the Fourier lens and the reference beam from the pinhole.

DETAILED DISCLOSURE OF THE INVENTION

Embodiments of the subject invention pertain to a portable QPM system and method working in both transmission and reflection modes. The temporal and spatial sensitivity of the QPM system, as quantified by optical path-length difference (OPD) values, are as good as 0.65 nm and 1.04 nm, respectively. When the term "about" is used herein, in conjunction with a numerical value, it is understood that the value can be in a range of 90% of the value to 110% of the value, i.e. the value can be +/−10% of the stated value. For example, "about 1 kg" means from 0.90 kg to 1.1.

System Design

Figure 1A:
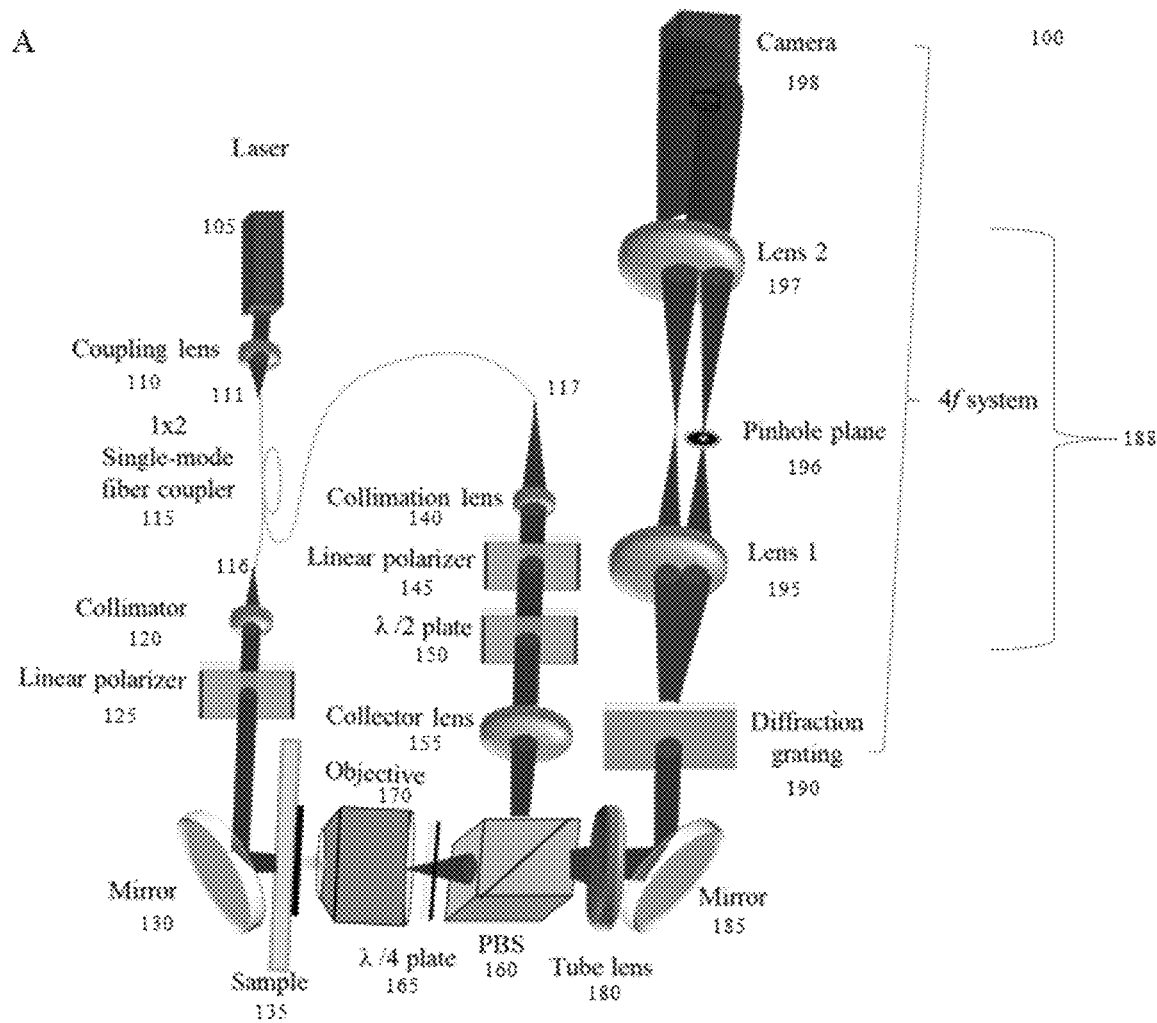
FIG. 1A is the schematic diagram of a portable QPM system according to an embodiment of the subject invention.

Referring to FIG. 1A, a portable QPM system 100 for quantitative phase imaging a sample, such as living cells or fabricated micro/nano structures, comprises an illuminating source 105 for generating an illuminating beam, a fiber coupler 115 including an input end 111 coupled to the illuminating source 105, and a coupling lens 110 disposed between the illuminating source 105 and the fiber coupler 115. Upon receiving the illuminating beam from the illuminating source 105, the fiber coupler 115 can be configured to provide a first illuminating beam outputting from a first output end 116 to propagate along a transmission-mode path and a second illuminating beam outputting from a second output end 117 to propagate along a reflection-mode path.

In the transmission-mode path, the portable QPM system 100 further comprises a first linear polarizer 125 disposed to receive the first illuminating beam transmitted from the fiber coupler 115, a first collimator 120 disposed between the first output end of the fiber coupler 115 and the first linear polarizer 125, and a first mirror 130 disposed between the first linear polarizer 125 and the sample 135. The first collimator 120 is configured to collimate the first illuminating beam from the fiber coupler and the first linear polarizer 125 is configured to linearly polarize the first illuminating beam before illuminating the sample 135. Moreover, the first mirror 130 can be configured to reflect the first illuminating beam received from the first linear polarizer 125 to the sample 135. After the sample, the transmission-mode and the reflection-mode share a same light path.

In the reflection-mode path, the portable QPM system 100 further comprises a second linear polarizer 145 disposed to receive the second illuminating beam transmitted from the fiber coupler 115 and a second collimator 140 disposed between the second output end 117 of the fiber coupler 115 and the second linear polarizer 145. The second collimator 140 is configured to collimate the second illuminating beam transmitted from the fiber coupler 115 before the second illuminating beam entering the second linear polarizer 145. The second linear polarizer 145 can be configured to linearly polarize the second illuminating beam received.

Referring again to FIG. 1A, in the reflection-mode path, the portable QPM system 100 further comprises a half-wave plate 150 disposed to receive the second illuminating beam transmitting from the second linear polarizer 145, a polarization beam splitter (PBS) 160 disposed to receive the second illuminating beam from the half-wave plate 150, and a collector lens 155 disposed between the half-wave plate 150 and the PBS 160. The half-wave plate 150 is configured to rotate the polarization of the second illuminating beam to 0 degree along a horizontal axis before entering the polarization beam splitter (PBS) 160.

In the reflection-mode path, the portable QPM system 100 further comprises a quarter-wave plate 165 disposed to receive the second illuminating beam from the PBS 160 and a microscope objective lens 170 disposed to receive the second illuminating beam from the quarter-wave plate 165. The quarter-wave plate 165 is configured to rotate an imaging field polarization state by 90° along a vertical axis such that the second illuminating beam only goes along a right-hand side port of the PBS 160 before forming an image. Moreover, the microscope objective lens 170 is configured to transmit the second illuminating beam to the sample and receive a third illuminating beam formed by the second illuminating beam reflected by the sample. The same microscope objective lens is also configured to transmit the first illuminating beam propagating along the transmission-mode path and transmitting through the sample for imaging. When the transmission-mode is used for measuring transparent samples, the reflection-mode illumination source will be shut off or blocked; likewise, when the reflection-mode is used for measuring reflective samples, the transmission-mode illumination source will be shut off or blocked. For semi-transparent samples, the transmission-mode and the reflection-mode can be used simultaneously.

In one embodiment, the microscope objective lens 170 can be a ZEISS lens (40×/0.55 and LD A-Plan).

After the illuminating beam is reflected off the sample, the imaging field is created that carries structural information of the sample in a phase of the imaging field.

It is noted that the collector lens 155 and the microscope objective lens 170 together form a 4f system to ensure a uniform and collimated beam illuminating the sample in a field of view. Moreover, the half-wave plate 150, the quarter-wave plate 165 and the second linear polarizer 145 together form an isolator ensuring that the second illuminating beam unidirectionally propagates.

As illustrated in FIG. 1A, the portable QPM system 100 further comprises a tube lens 180 disposed to receive the third illuminating beam from the PBS 160, a common-path interferometer system 188 disposed to receive the third illuminating beam from the tube lens 180, a second mirror 185 disposed between the tube lens 180 and the common-path interferometer system 188 to reflect the third illuminating beam from the tube lens 180 to the common-path interferometer system 188.

The common-path interferometer system 188, which is based on the diffraction phase microscopy (DPM) design, can comprise a diffraction grating 190 disposed in an intermediate image plane, a Fourier lens 195, a pinhole 196, and after the pinhole 196, a 2f system formed with a 2f system lens 197.

Moreover, the diffraction grating 190 located at the intermediate image plane is configured to receive the third illuminating beam from the mirror 185 and generates beams of multiple image orders, wherein a $0^{th}$ diffraction order beam is an imaging beam and a $1^{st}$ diffraction order beam is a reference beam. The Fourier lens 195 having a predetermined focal length is disposed to receive both the $0^{th}$ diffraction order beam and the $1^{st}$ diffraction order beam from the diffraction grating 190 and configured to focus them down. Furthermore, the pinhole 196 is disposed in the Fourier plane to receive the $1^{st}$ order beam and is configured to be a low-pass filter for the $1^{st}$ order beam. The 2f system lens 197 is disposed to separately receive the imaging beam from the Fourier lens 195 and the reference beam from the pinhole 196. The 2f system lens 197 is configured to collimate the reference beam and the imaging beam such that the collimated reference beam and imaging beam interfere with each other to form an interferogram at a final image plane.

The portable QPM system 100 can further comprise an image capturing device, such as a USB camera 198 purchased from the PointGrey Corporation, disposed in the final image plane to capture the interferogram from which the phase of the imaging field is retrieved.

It is noted that the diffraction grating 190 can be configured such that the imaging beam travels through centers of the diffraction grating 190 and the 2f system lens 197 in order to avoid astigmatism in the imaging system. Moreover, when switching the operation mode, the sample holder does not necessarily need to be changed. The illumination source in transmission or reflection mode is blocked to switch the operation. For example, when operating in the reflection-mode, the illumination source in the transmission-mode is blocked.

In one embodiment, the illuminating source 105 can be a laser source providing a laser beam of a wavelength of 633 nm and a maximum output power of 4.6 mW. The fiber coupler 115 can be a single mode 1×2 fiber coupler such as one purchased from the Thorlabs Incorporation. For the reflection-mode light path, the laser beam is first expanded to have a diameter of about 10 mm before being linearly polarized.

In one embodiment, the diffraction grating 190 can be formed with 110 lines per mm (lpm) gratings. The pinhole 196 such as one purchased from Thorlabs Incorporation may have a diameter of about 5 µm. The 2f system lens 197 may have a 75 mm focal length. The Fourier lens 195 may have a predetermined focus length of 35 mm.

In this common-path geometry, the interferometer is mechanically stable which allows for highly sensitive phase measurements. The system is designed to follow the fringe sampling condition: $2.67\Delta x \leq \Lambda$, where $\Delta x$ is the camera pixel size, $\Lambda$ is the interference fringe period on the camera.

In one embodiment, the camera may have a pixel size of 4.8 µm and $\Lambda$ may be 19.5 µm (9.09 µm grating period multiply the 4f system magnification of 2.14), which sufficiently meets the sampling condition. Overall, the system may have a magnification of 52× and a field of view of 118 µm by 95 µm.

Figure 1B:
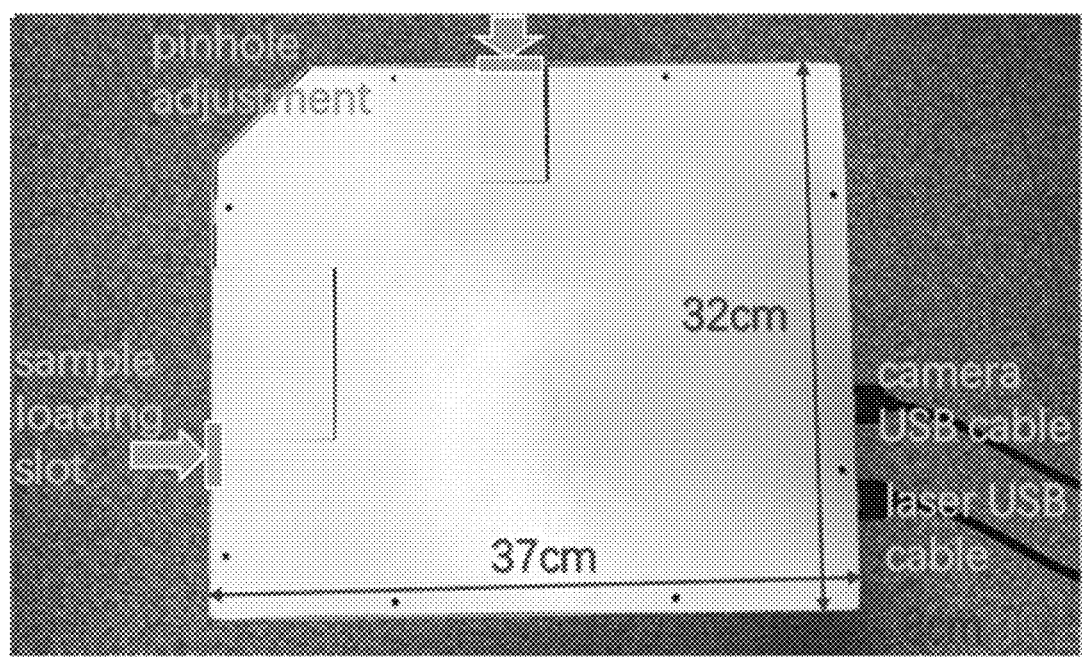
FIG. 1B is a photograph of a prototype of the portable QPM system according to an embodiment of the subject invention.

With the above optical design and a proper selection of the optical components, the portable QPM system can be dimensioned to have a size smaller than 30 cm×20 cm×5 cm. As shown in FIG. 1B, a cover (37 cm×32 cm×8 cm) slightly larger than the portable QPM system can be made to allow for transporting the system around different test sites. FIG. 1D shows the internal configuration of the portable QPM system. It is noted that the portable QPM system does not require any external components, such as a microscope body, a laser power control, or a sample stage. By being connected with USB ports of a computing device such as a computer, it is ready to be used for measuring either transparent or reflective samples, depending on the application requirements.

Figure 1C:
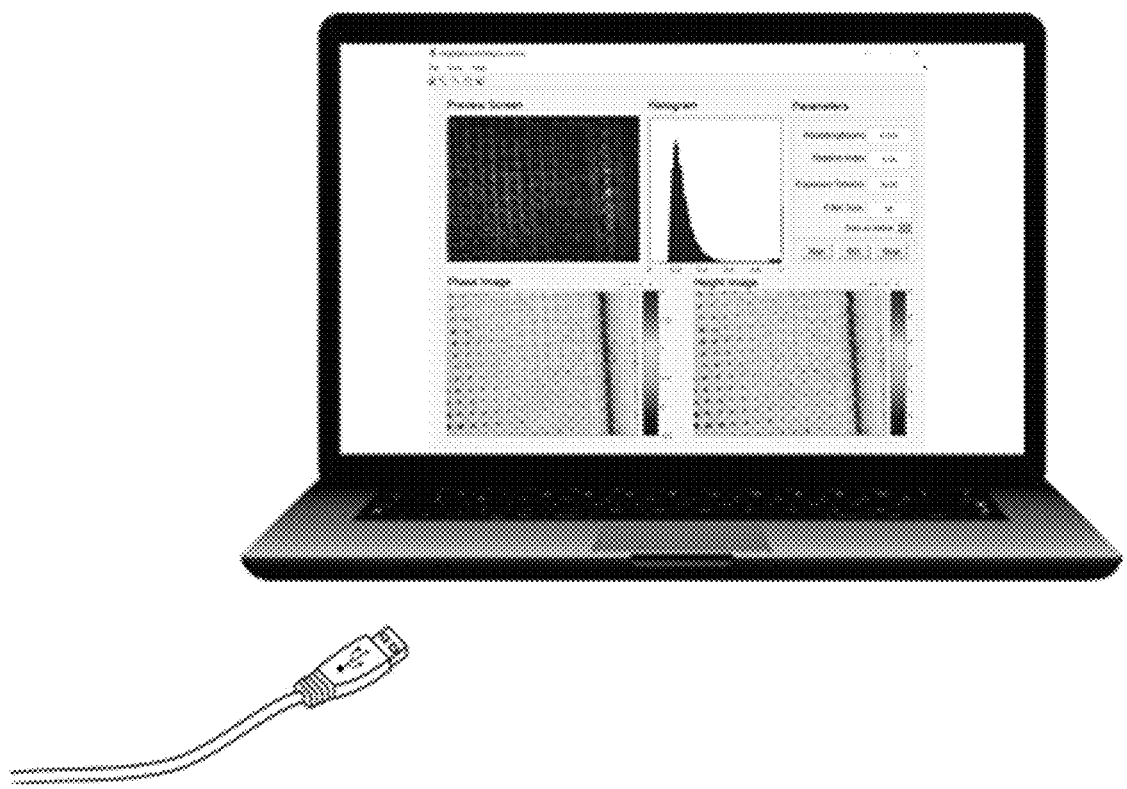
FIG. 1C is a schematic representation of a laptop computer running software with a graphic user interface (GUI) for phase retrieval and image processing for the portable QPM system, according to an embodiment of the subject invention.
Figure 1D:
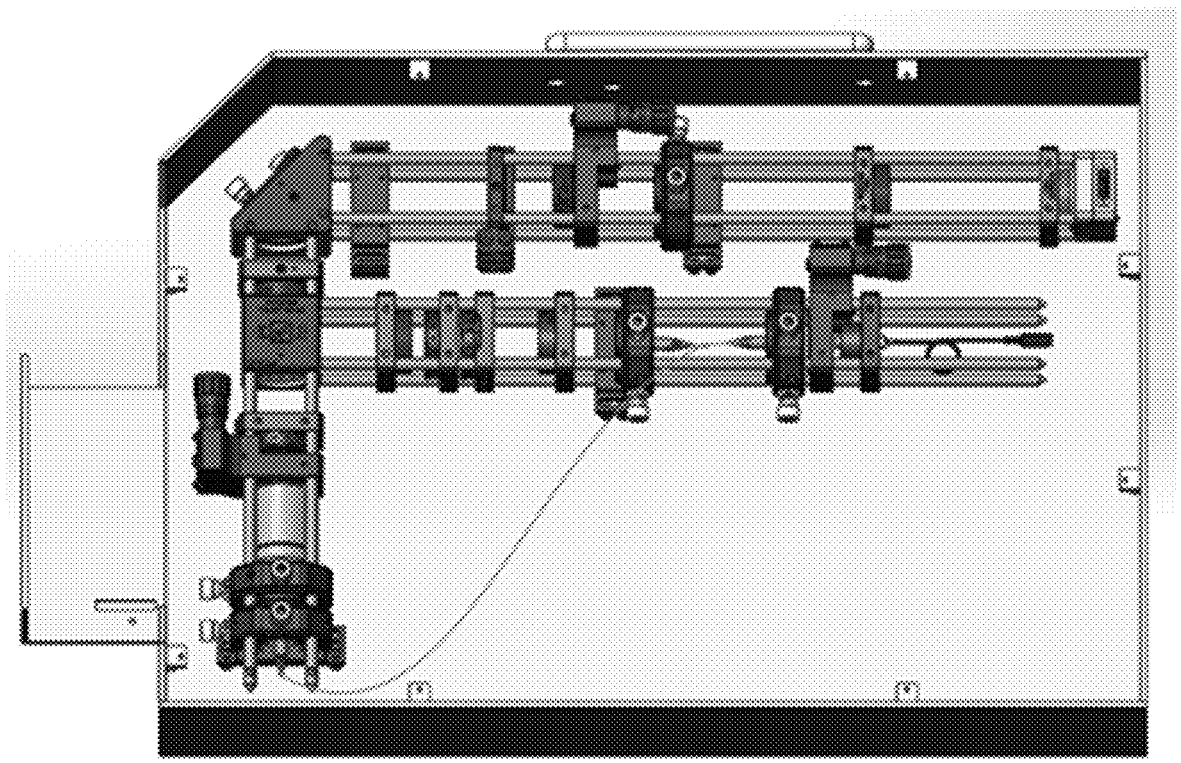
FIG. 1D a schematic representation of internal components of the portable QPM system according to an embodiment of the subject invention.

In one embodiment, by connecting the camera and powering the laser source through the USB ports of a laptop computer as shown in FIG. 1C, the portable QPM system is configured for imaging different samples according to various application requirements. The laptop may employ software with a graphic user interface (GUI) to perform phase retrieval and image processing for the portable QPM system.

Phase Retrieval and Phase Sensitivity

To reconstruct the phase map of the sample, a Fourier transform based phase retrieval method can be utilized. This method mainly requires following numerical operations: (1) performing Fourier transform of the captured sample interferogram and the calibration interferogram (i.e., the interferogram measured in the sample-free region), respectively; (2) bandpassing filter their corresponding +1$^{st}$ orders and shift them to the baseband; (3) inverse Fourier transforming of each baseband signal to obtain the complex imaging field and the complex calibration field, respectively; (4) obtaining the phase map by calculating the argument of the ratio of the complex imaging field and the complex calibration field; (5) performing phase unwrapping to obtain the final phase map.

As the phase map is retrieved through interferometry, its values are well-defined as the analytical solutions of the fringe modulation equation, making robust phase retrieval results. As the phase retrieval method can be parallelized, it can potentially allow for real-time phase imaging. However, for computation-based phase imaging methods (for example, less-free holography, FPM and TIE), multiple intensity images are normally measured, and sophisticated phase retrieval methods are developed to retrieve the phase maps with extensive computations. As only intensity images are measured, the retrieved absolute phase values can be method dependent.

Interferometry-based QPM methods are sensitive to external mechanical vibrations, which can be minimized through a common-path design. At the same time, a compact system design can minimize the light travel distance to effectively reduce the effect of mechanical vibration. Phase noise, often characterized by the optical path-length difference (OPD), is an important parameter to characterize the stability of a QPM system.

Figure 2A:
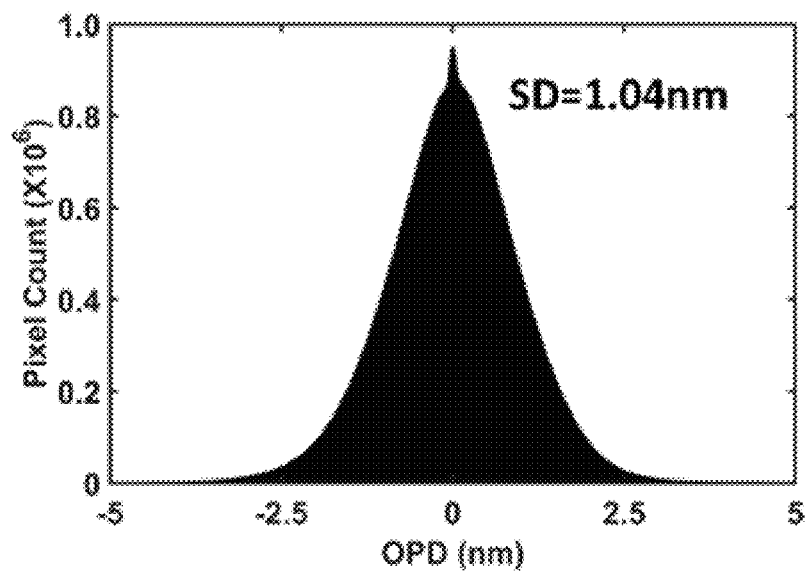
FIG. 2A is a histogram of optical path-length difference (OPD) values for all pixels of all frames of the portable QPM system according to an embodiment of the subject invention.
Figure 2B:
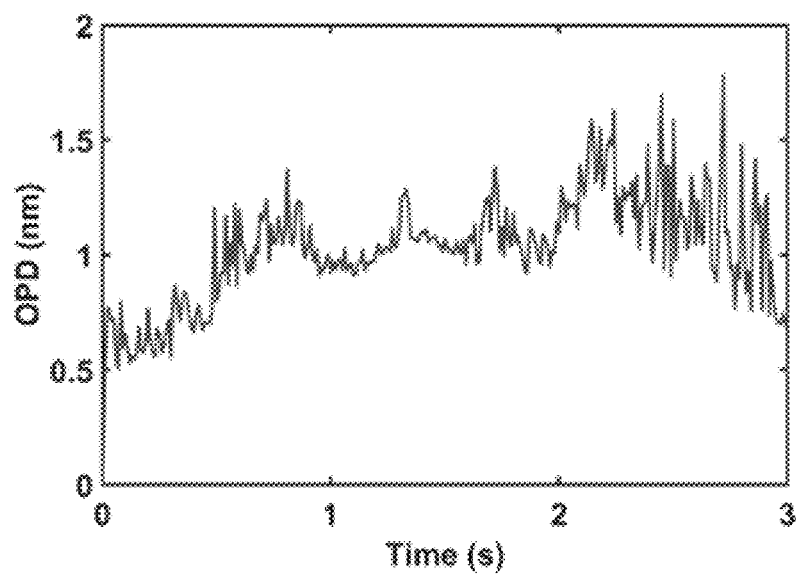
FIG. 2B is a temporal fluctuation of the frame-averaged OPD values of the portable QPM system according to an embodiment of the subject invention.
Figure 2C:
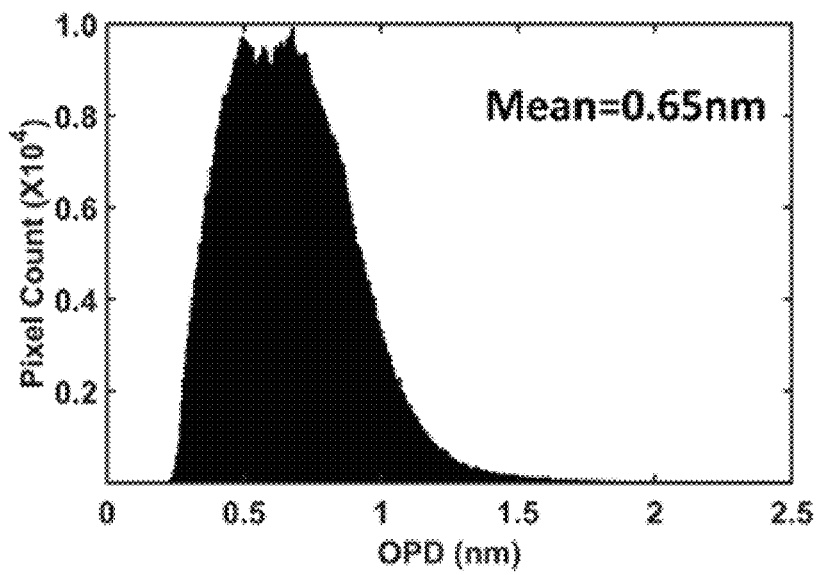
FIG. 2C is a histogram of the OPD standard deviation values of the portable QPM system according to an embodiment of the subject invention.
Figure 2D:
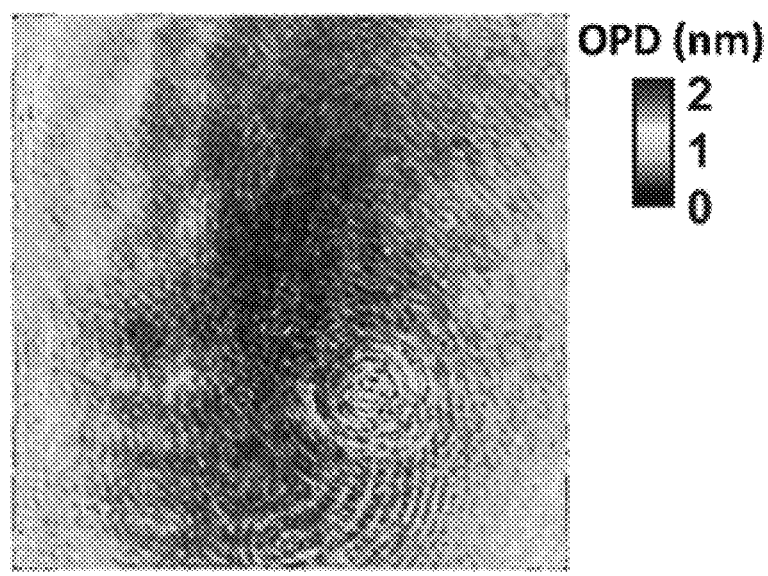
FIG. 2D is an OPD map averaged over all the frames of the portable QPM system according to an embodiment of the subject invention.

In the absence of sample, 300 interferograms are measured at 100 fps and their corresponding phase maps are retrieved for noise characterization. FIG. 2A shows the histogram of the OPD values for all the pixels of the 300 frames. The distribution has a standard deviation of 1.04 nm, which is determined to be the phase spatial noise value. FIG. 2C shows the histogram of the OPD standard deviation values, calculated for each pixel over time. The median value of the histogram is 0.65 nm, which is determined to be the phase temporal noise. Both the spatial and the temporal phase noise values are comparable with other laser-based QPM systems previously reported. According to a recent study, the phase noise is ultimately related to the photon shot noise which determines the phase sensitivity to be around $1/\sqrt{N}$, where N is the electron well capacity. As most cameras have an electron well capacity of around 10,000 to 60,000 electrons, therefore the phase noise after converting to the OPD value is normally on the order of 1 nm. FIG. 2B shows the temporal fluctuation of the frame-averaged OPD value over 3 seconds, while FIG. 2D shows the OPD map that is averaged over all the 300 frames.

Lateral Resolution

Figure 3A:
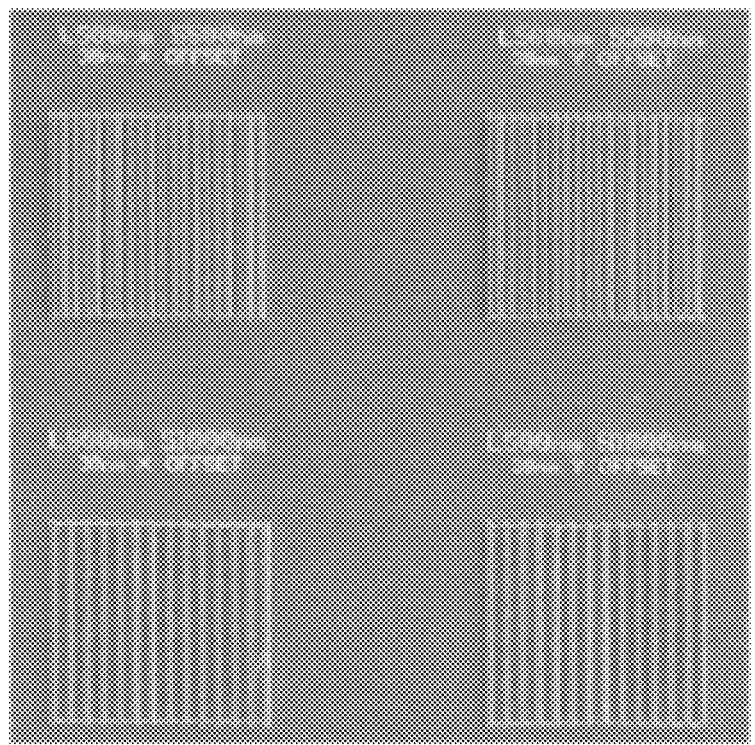
FIG. 3A is a SEM image of a part of a National Institute of Standards and Technology (NIST) Reference Material (RM) 8820 sample with L500 nm, S500 nm, and L500 nm, S1000 nm lines, according to an embodiment of the subject invention.
Figure 3B:
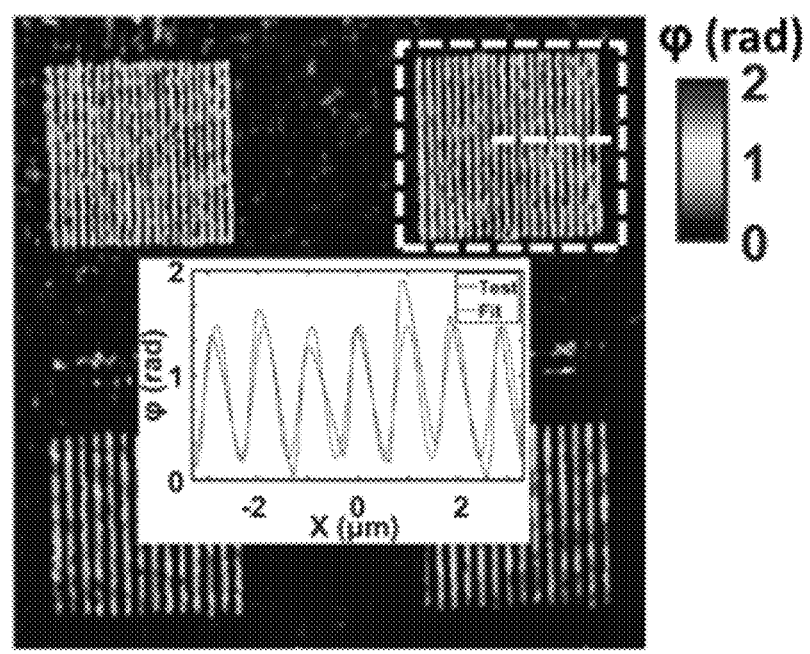
FIG. 3B is a phase map measured by the portable QPM system, the inset figure showing the line profile indicated by the white dotted line, according to an embodiment of the subject invention.

According to the Abbe criterion, the lateral resolution of the portable QPM imaging system of an embodiment of the subject invention is determined to be $\lambda/NA \approx 1.15$ µm (or full-pitch resolution). To further validate the resolution of the QPM system, a NIST Reference Material (RM) 8820 sample is measured. FIG. 3A shows a SEM image of the structures label as L500 nm, S500 nm and L500 nm, S1000 nm lines. FIG. 3B is the phase map obtained by the portable QPM system of an embodiment of the subject invention. In the inset of FIG. 3B, the line profile of the L500 nm S500 nm lines indicated by the white dotted line in the rectangular box is plotted, from which each individual line is clearly resolved. The measured profile is fitted to a sinusoidal function and the line period is determined to be 0.96 µm which agrees with the 1 µm value of previous studies.

Height Profile Measurement

Furthermore, the height measurement accuracy of the portable QPM system is determined by measuring a plurality of calibration samples.

Figure 4A:
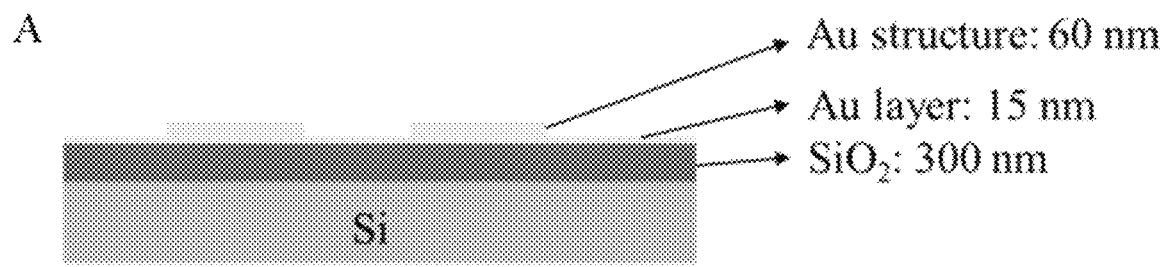
FIG. 4A is a schematic representation of gold electrodes in a transistor sample, according to an embodiment of the subject invention.
Figure 4B:
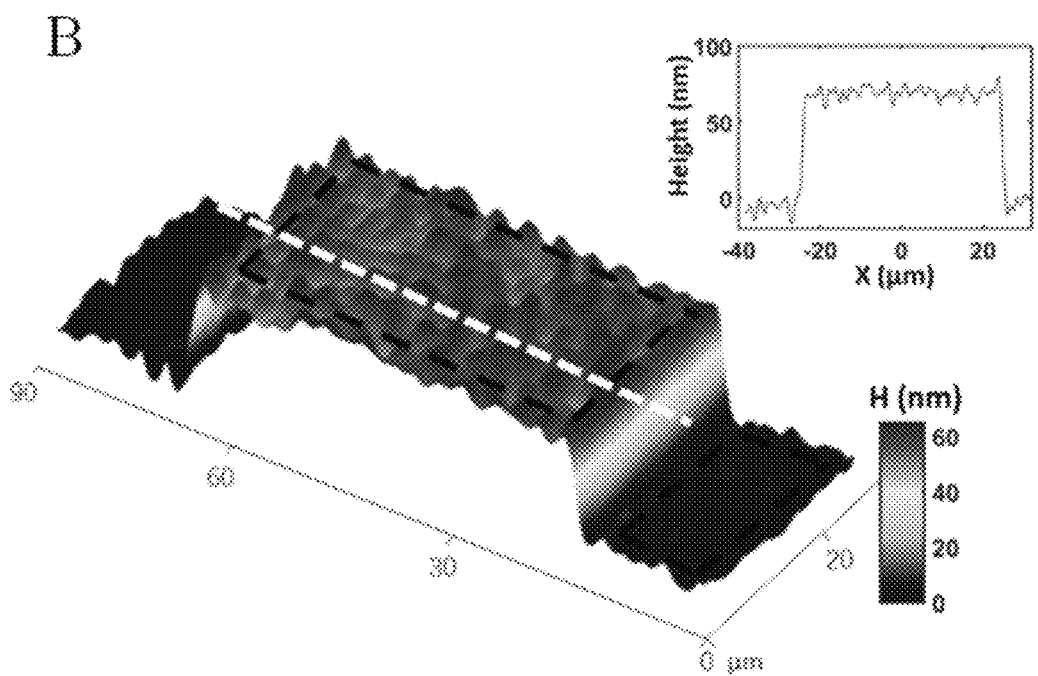
FIG. 4B is a height map of the transistor sample obtained by the portable QPM system; the inset figure showing a line profile of structure of the transistor sample along the white dotted line of FIG. 4B, according to an embodiment of the subject invention.

For reflection-mode testing, gold electrodes of source and drain electrodes for making field-effect transistor structures are provided by depositing gold (Au) patterns on $Si/SiO_2$ substrate, as shown in FIG. 4A. Au structure with a thickness of 60 nm is deposited by thermal deposition and photolithography. Then, another layer of 15 nm Au layer is deposited over the whole device to make the sample fully reflective, so that the height profile of Au patterns we could be measured. The surface height map for a portion of the device is reconstructed by the portable QPM system as shown in FIG. 4B.

Figure 4C:
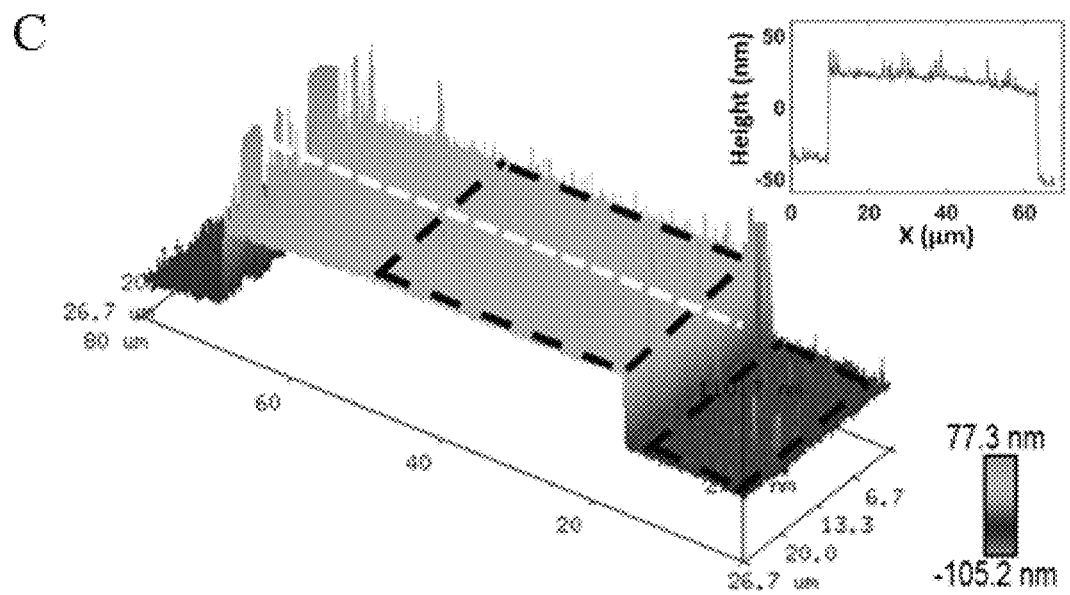
FIG. 4C is an atomic force microscope (AFM) image of the transistor sample (Software: NanoScope Analysis 1.5), the inset figure showing the line profile of the structure of the transistor sample along the white dotted line in FIG. 4C, according to an embodiment of the subject invention.

FIG. 4C is an atomic force microscope (AFM) image of the transistor sample (Software: NanoScope Analysis 1.5), the inset figure showing the line profile of the structure of the transistor sample along the white dotted line in FIG. 4C, according to an embodiment of the subject invention.

Figure 4D:
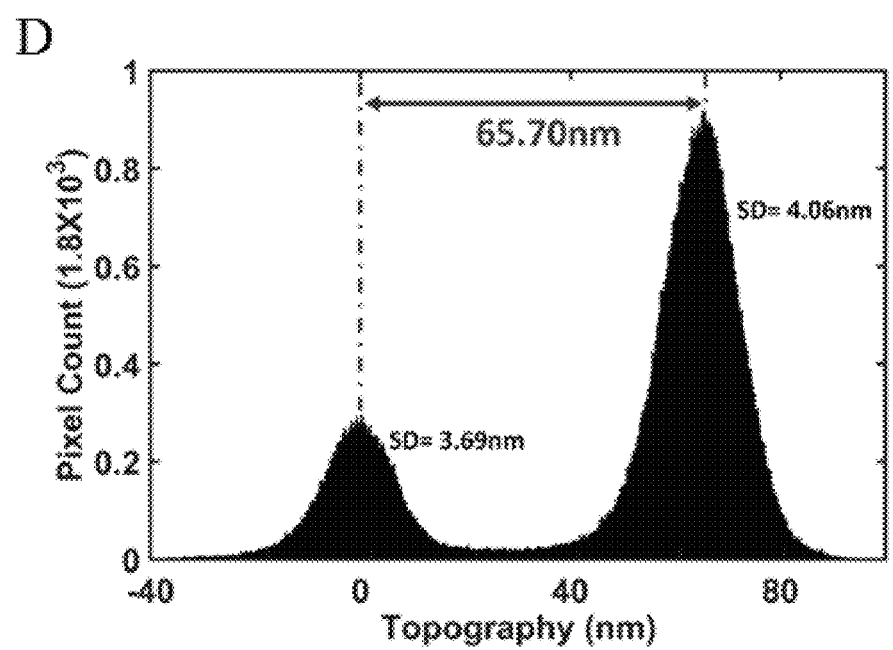
FIG. 4D is a height histogram of the gold (Au) structure area and the bottom area selected in FIG. 4B, according to an embodiment of the subject invention.

Two areas are selected, one on the Au structure and the other one on the bottom structure as indicated by the black dotted boxes, and then the height histogram is plotted as shown in FIG. 4D. From the histogram, the average height is determined and its standard deviation (SD) on the Au structure region is determined to be about 65.70 nm and about 4.06 nm, respectively. In order to validate the measurement accuracy, the height maps of the same pattern area with an AFM system (Nanoscope Ma, Bruker) in the tapping mode are measured as shown in FIG. 4D. Similarly, the height histogram for the selected areas is plotted and the average height of the Au structure is determined to be about 64.85 nm and its standard deviation to be about 5.25 nm. The values are in a good agreement with the QPM measurements.

It is noted that the SD values in both systems are very similar but much larger than the phase spatial noise of around 1 nm, which is probably due to the surface roughness of the Au structure surface. It is observed that it takes more than 10 minutes to acquire an image of a size of 512×512 by the AFM, while the same image only required a few milliseconds to be obtained by the portable QPM system of the subject invention.

In one embodiment, the phase map is converted to the height map, h(x,y), based on following equations for transmission mode and reflection mode, respectively:

$$h(x, y) = \frac{\varphi(x, y)\lambda}{2\pi\Delta n}, \quad (1a)$$

$$h(x, y) = \frac{\varphi(x, y)\lambda}{4\pi}, \quad (1b)$$

where φ(x,y) is the phase map, λ is the wavelength of the laser source. For transmission mode height calculation using Eq. (1a), Δn is the refractive index contrast between the sample and the medium. For reflection mode, height calculation is based on Eq. (1b), as light travels in the air first to the surface of the sample and then gets reflected. There is a factor of 2 accounts for the double-pass, i.e., Δn is replaced with 2.

Figure 4E:
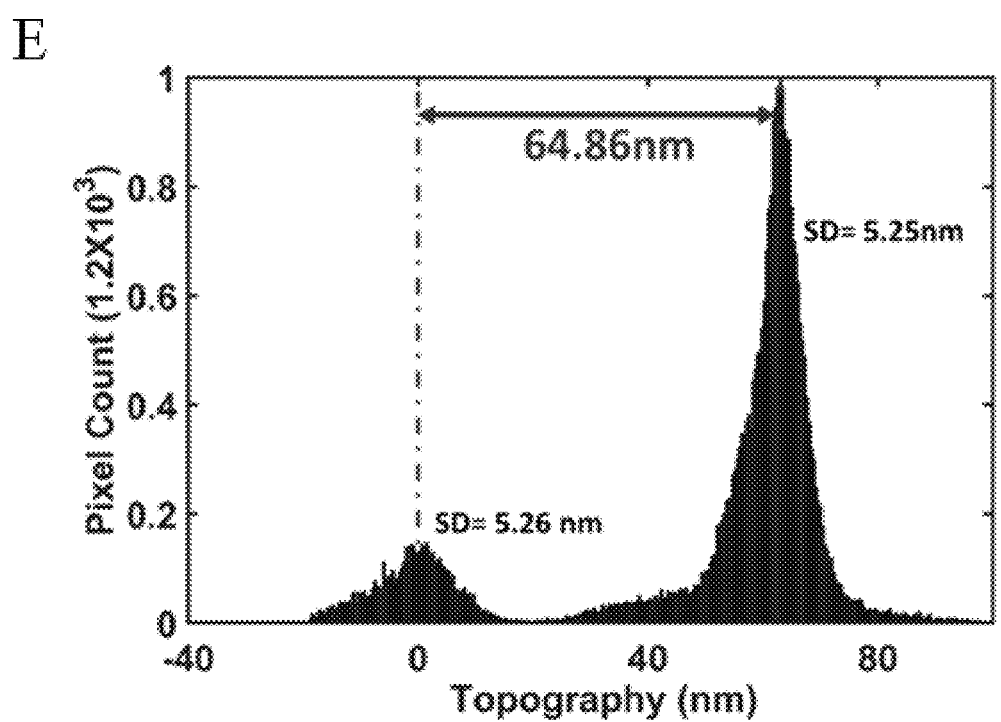
FIG. 4E is a height histogram of the gold (Au) structure area and the bottom area selected in FIG. 4C, according to an embodiment of the subject invention.

FIG. 4E is a height histogram of the Au structure area and the bottom area selected in FIG. 4C, according to an embodiment of the subject invention.

Figure 5A:
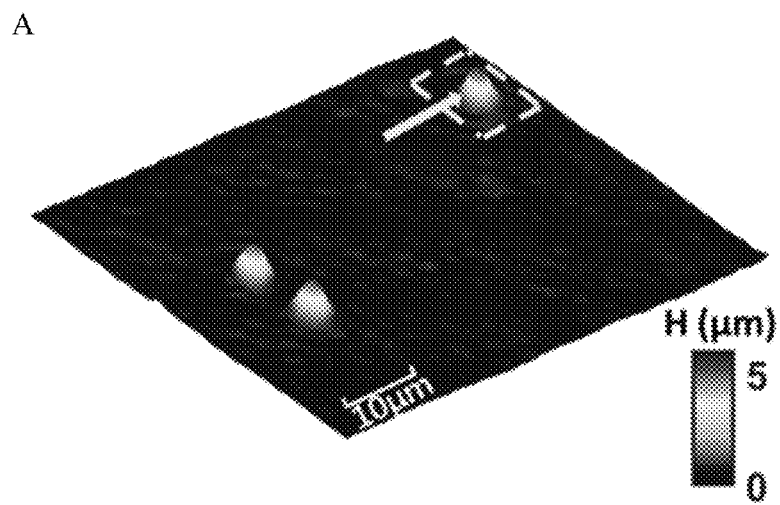
FIG. 5A is height map of beads having a diameter of about 5 μm obtained by the portable QPM system according to an embodiment of the subject invention.
Figure 5B:
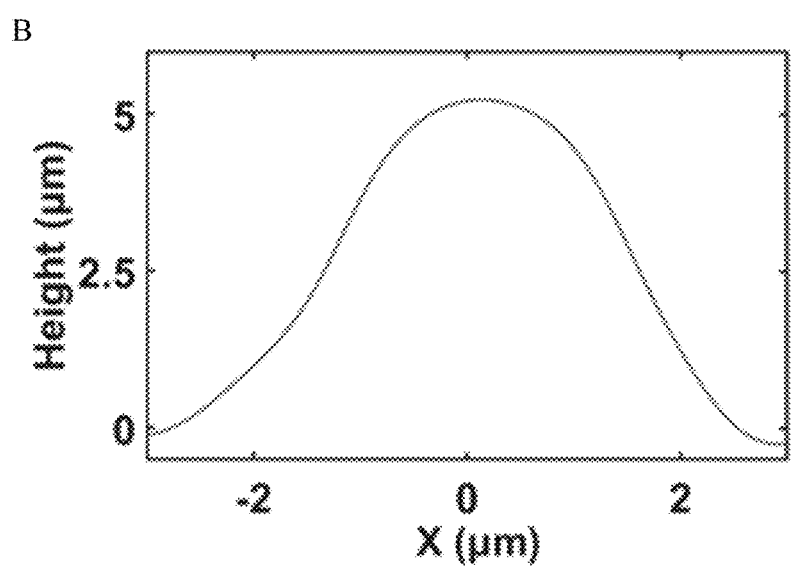
FIG. 5B is a line profile along a direction indicated by a yellow arrow of one of the beads of FIG. 5A obtained by the portable QPM system according to an embodiment of the subject invention.

For transmission-mode testing, standard spherical polystyrene beads with a refractive index value of 1.59 and a diameter of 5 (Part No. 4205A, Thermo Fisher) are used. These beads are suspended in the index-matching liquid (such as the index-matching liquid from Cargille Labs) that has a matched refractive index value of 1.57. A height map retrieved by the portable QPM system of the subject invention for three beads is shown in FIG. 5A. FIG. 5B shows the line profile for the beads in the yellow rectangle area, whose height is determined to be around 5 μm.

Imaging Application Examples

To demonstrate its broad applicability, the portable QPM system at different material metrology and biological imaging settings, including but not limited to, profiling cleanroom fabricated device structures, quantifying red blood cell (RBC) membrane fluctuations, imaging live cells flowing in microfluidic devices are described below. Experimental measurements of different samples under either the reflection mode or the transmission mode are conducted.

A. Material Structure Metrology

Figure 6A:
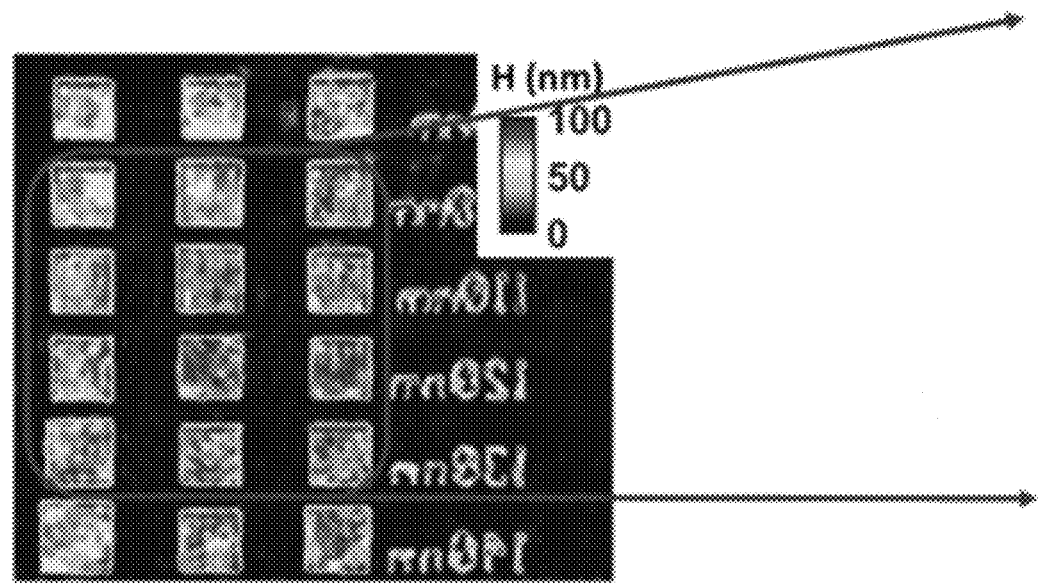
FIG. 6A is a height map of a selected area of a NIST Reference Material (RM) 8820 sample obtained by the portable QPM system according to an embodiment of the subject invention.
Figure 6B:
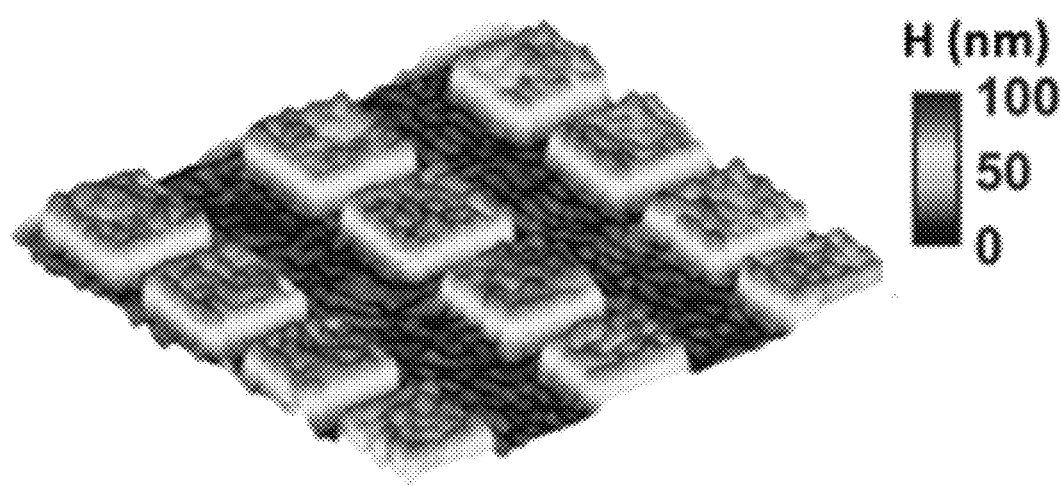
FIG. 6B is a zoom-in three-dimensional (3D) height map of the chip structure of FIG. 6A obtained by the portable QPM system according to an embodiment of the subject invention.
Figure 6C:
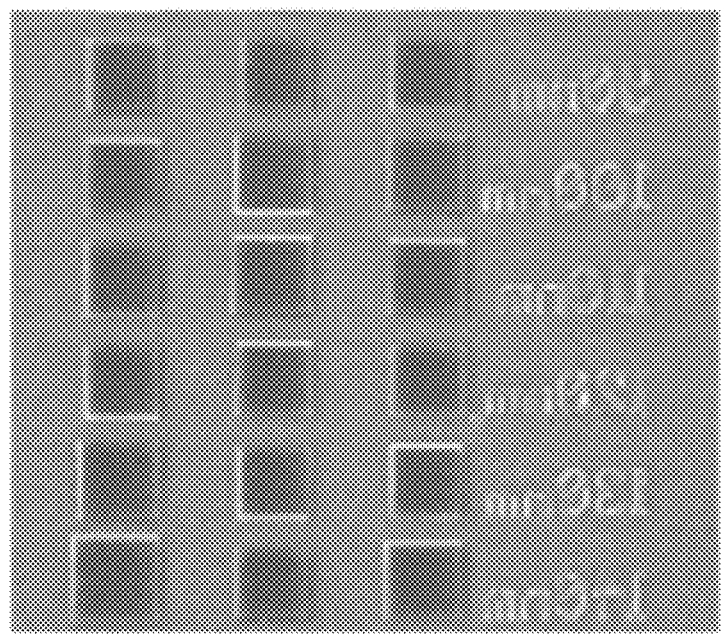
FIG. 6C is a SEM image of the selected area according to an embodiment of the subject invention.
Figure 6D:
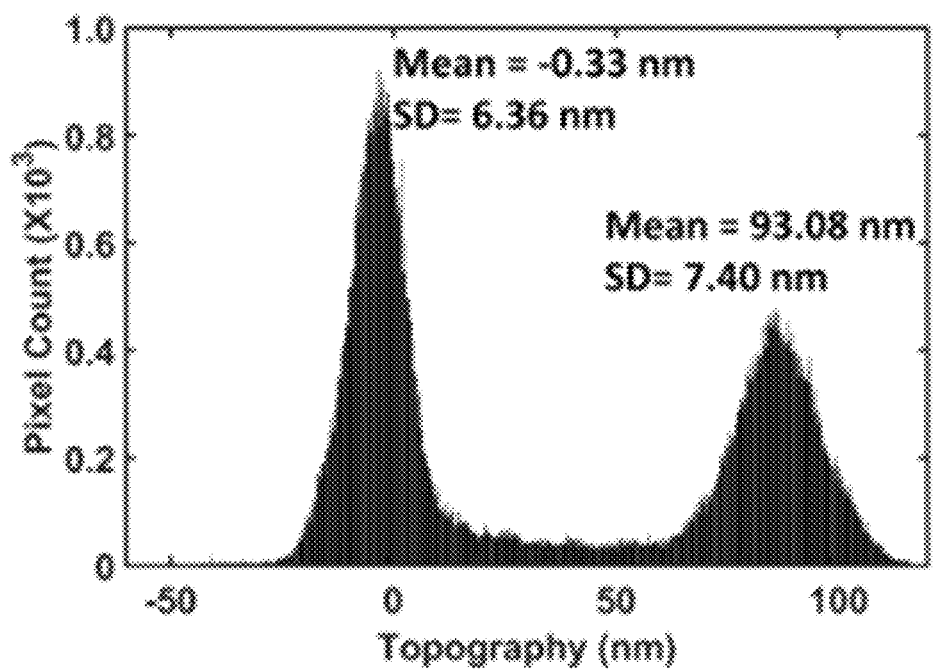
FIG. 6D is a histogram of the topography map in FIG. 6B obtained by the portable QPM system according to an embodiment of the subject invention.

Under the reflection-mode, the NIST Reference Material (RM) 8820, which has been widely used as a calibration sample in industry, is measured. The mean height and the height standard deviation of the sample features are determined to be 97.3 nm and 1.6 nm, respectively. FIGS. 6A and 6B show the measured height and topography map for a portion of the sample whose corresponding scanning electron microscope (SEM) image is shown in FIG. 6C. According to the topography histogram shown in FIG. 6D, the mean height is determined to be about 93.41 nm, while the height standard deviation for the feature area is determined to be about 7.4 nm. The measured height standard deviation value is greater than the reference value, probably due to sample contamination and laser speckles.

B. Red Blood Cell Imaging

The portable QPM system according to an embodiment of the subject invention is used to obtain the morphological, biochemical, and biomechanical properties of individual cells. As an example, QPM can be used to measure the morphology of RBCs, from which RBC mechanical properties can be extracted. Due to its easier availability, the portable QPM system greatly facilitates those biological observations.

Figure 7A:
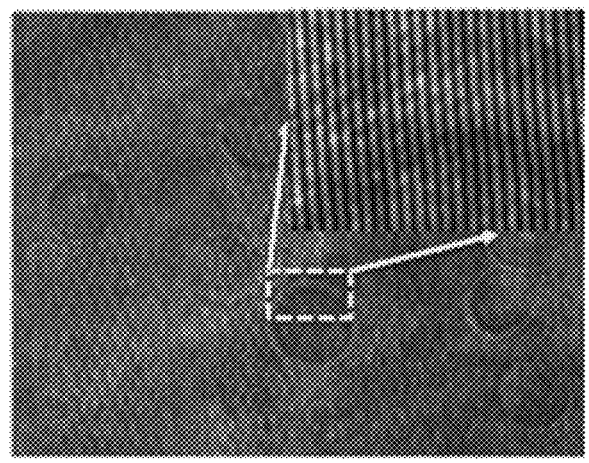
FIG. 7A is a raw interferogram image of red blood cells (RBCs) and a zoom-in part image of the RBCs to show fringe contrast and bending according to an embodiment of the subject invention.
Figure 7B:
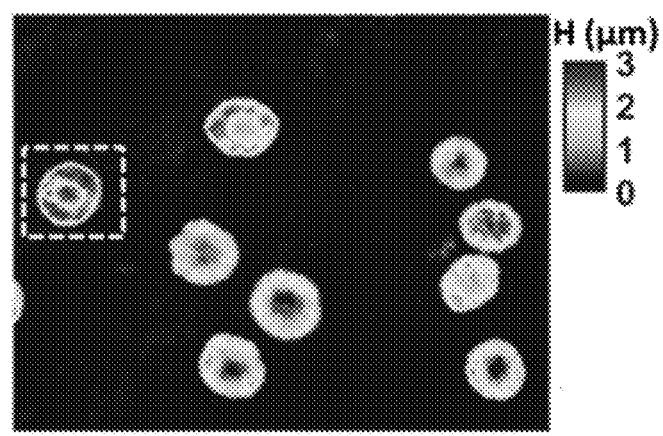
FIG. 7B is a retrieved height map of the RBCs of FIG. 7A according to an embodiment of the subject invention.
Figure 7C:
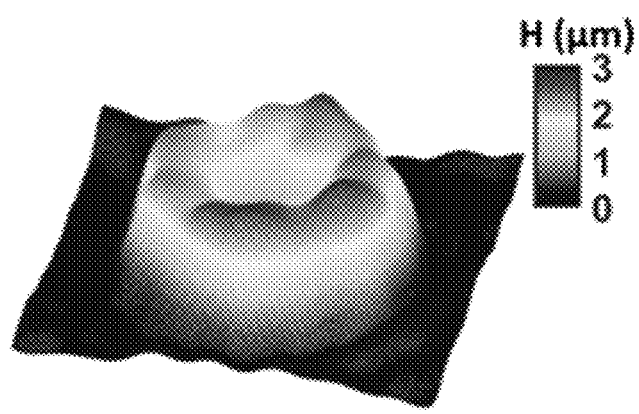
FIG. 7C is a snapshot of the membrane height fluctuation for the RBCs selected in FIG. 7B according to an embodiment of the subject invention.

For the transmission-mode testing, fresh RBCs in phosphate-buffered saline solution are measured. FIGS. 7A and 7B show the raw interferogram and the retrieved surface height profile of the RBCs, respectively. The dynamic fluctuation of RBC membrane height can be observed by acquiring time-lapse photography. FIG. 7C is a snapshot of the membrane height fluctuation for the RBCs selected in FIG. 7B according to an embodiment of the subject invention. Thanks to its unique single-cell profiling capability, the portable QPM system is suitable for RBC-related pathophysiological studies and disease diagnoses, especially at resource-limited settings.

C. Flowing Cell Imaging

Figure 8A:
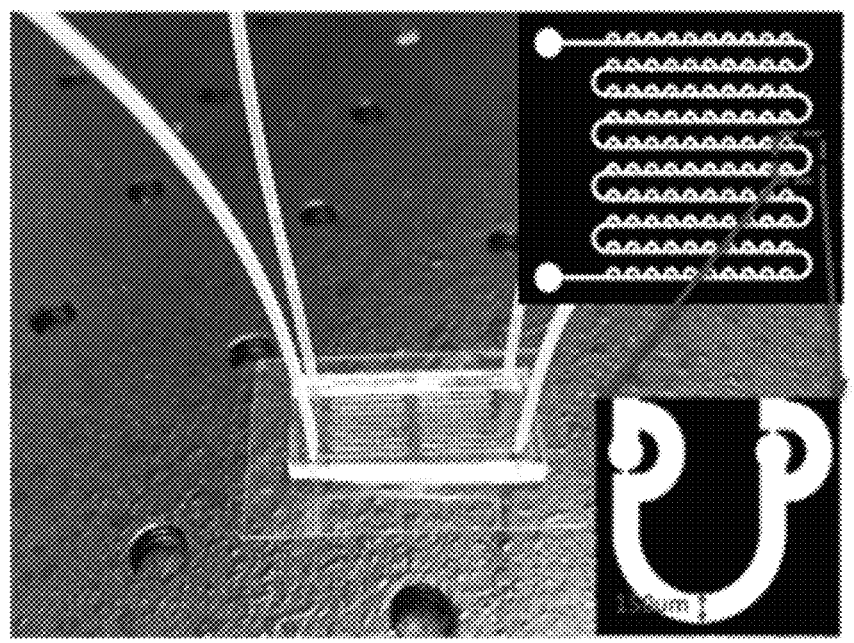
FIG. 8A is an image of a microfluidic device and geometry of the channels obtained by the portable QPM system, according to an embodiment of the subject invention.
Figure 8B:
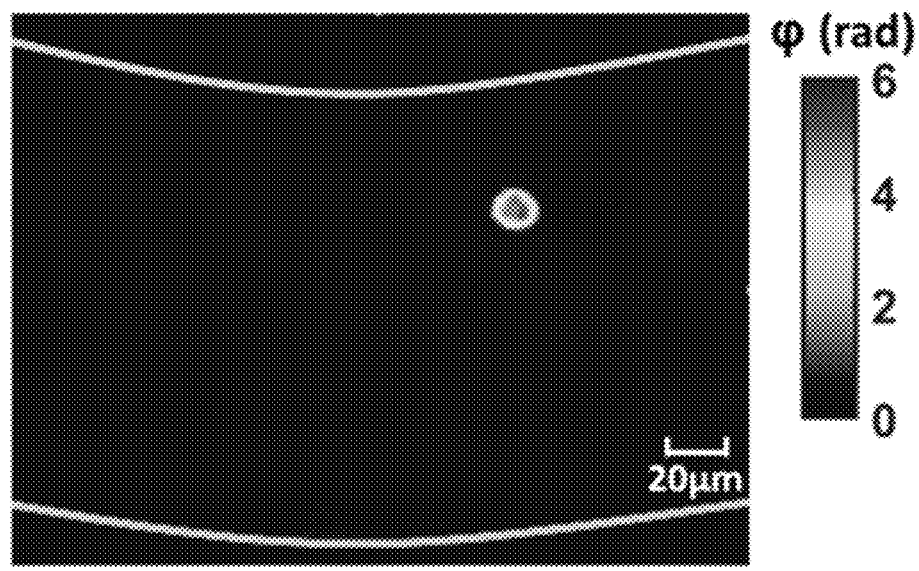
FIG. 8B is a representative phase image showing the imaging field of view of the microfluidic channel according to an embodiment of the subject invention.

Microfluidic devices have been widely used for various cytometry applications. The portable QPM system can be integrated with a microfluidic device for image cytometry applications to enable statistical analysis of large-scale cell populations. FIG. 8A shows the actual microfluidic device and the channel geometry. The device is first mounted on the sample holder before flowing mouse myoblast cell line (for example, C2C12 cell line) at a rate of 2.5 mm/s in the channel. Time-lapse frames of interferograms are captured and then processed to obtain a time-lapse of phase images. FIG. 8B shows a representative phase image illustrating the imaging field of view of the microfluidic channel, enclosed by the yellow lines. The phase maps of a plurality of different myoblasts, captured in the phase image time-lapse, are shown in FIG. 8D. For statistical analysis of large-scale cell populations, the dry mass of each cell, i.e., the non-aqueous content of the cell, can be extracted from the phase map. The dry mass, M, can be obtained by following equation:

$$M = \lambda/2\pi\alpha \int \varphi(x,y) dA, \quad (2)$$

where α is the refractive index increment, and A is the area of the entire projected cell area. Here, an average value of 0.2 mL/g for α is used to calculate the dry mass of myoblasts from the measured phase maps.

Figure 8C:
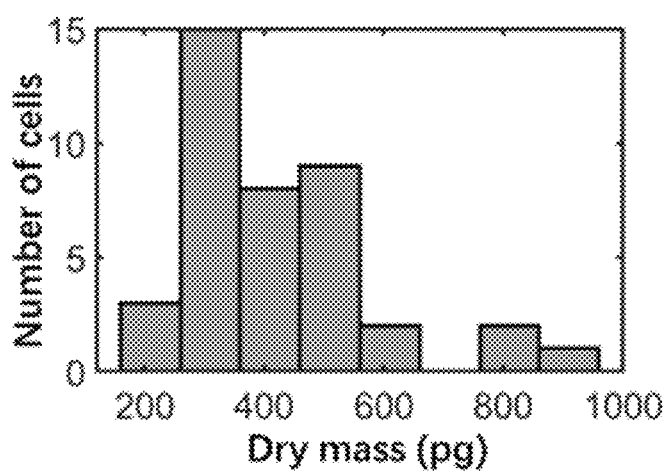
FIG. 8C is a histogram of cell dry mass for the captured muscle cells in the microfluidic channel according to an embodiment of the subject invention.
Figure 8D:
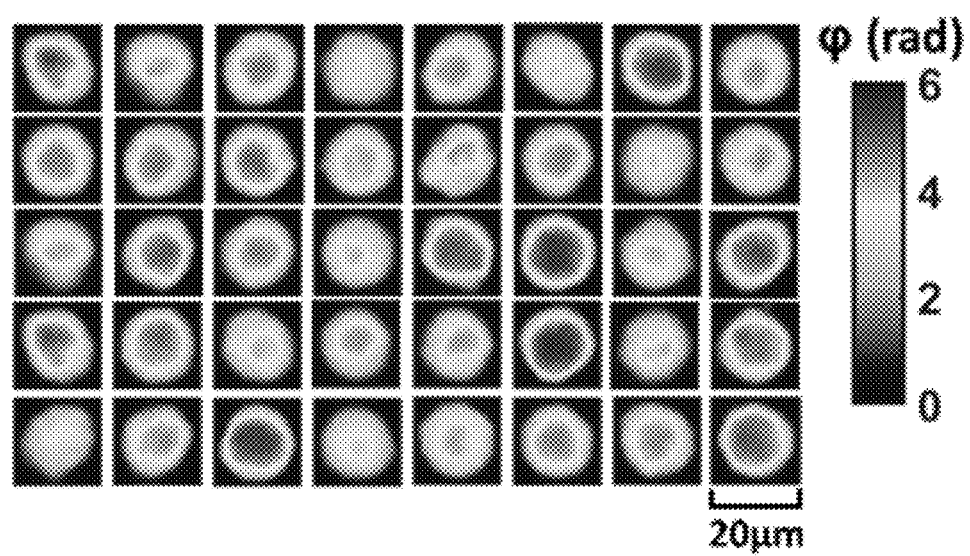
FIG. 8D shows phase maps of a plurality of selected myoblasts captured in the microfluidic channel according to an embodiment of the subject invention.

For a simple analysis, in FIG. 8C the histogram of the dry mass distribution for the captured myoblasts is plotted. The dry mass values of the mouse myoblasts are distributed within 200-1000 pg, which is corroborated by previous reports for similar cell types. In previous reports, Archimedes' method is implemented in a microfluidic system to measure the density of single cells by using the suspended microchannel resonator (SMR). Compared with this method, the portable QPM system of the subject invention can provide faster and more convenient measurements of the cell dry mass. For larger population cell analysis and phenotyping in practice, a more complex statistical analysis method that is based on cell shape and dry mass can be developed.

The low-cost portable QPM system having the DPM-based common-path interferometer according to embodiments of the subject invention achieves high sensitivity and has demonstrated various material metrology and biological imaging applications under either transmission mode or reflection mode.

The phase measurement accuracy and precision of the portable QPM system have been validated by profiling different home fabricated samples as well as standard reference material samples. The results have shown strong agreements with the gold standard atomic force microscopy and the manufacturing specifications. The temporal and spatial noise of the portable QPM system is determined to be about 0.65 nm and about 1.04 nm, respectively, which agree with values previously reported in prior art.

The portable QPM system can be utilized for profiling various fabricated reflective structures as well as live red blood cell membrane fluctuations. For cytometry applications, cells flowing in a custom-made microfluidic chip can be imaged. It is noted that the portable QPM system does not require an external microscope, and its data and power can be supplied through USB ports of a computer.

The proper design that integrates polarization optics and fiber components allows for shrinking the full dimension of the portable QPM system to a size smaller than 30 cm×20 cm×5 cm. Such a small footprint enables broader deployment at different environmental settings, including in resource limited situations and integrating with other imaging modalities.

The low-cost portable QPM system according to embodiments of the subject invention are capable of profiling fabricated micro-structures or nano-structures, quantifying cell morphology such as red blood cell (RBC) membrane fluctuations, and imaging live cells in microfluidic devices.

Unlike the conventional QPM systems based on a bulky microscope body, the portable QPM system of the subject invention can be dimensioned to be smaller than a size of 30 cm×20 cm×5 cm. Moreover, by being externally connected through USB ports, the portable QPM system can be easily transported for imaging at different research laboratories and resource-limited sites, or for integration with other metrology or imaging modalities.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

1. Popescu, G., Quantitative phase imaging of cells and tissues. McGraw-Hill: New York, 2011; p xx, 362 p.
2. Lee, K.; Kim, K.; Jung, J.; Heo, J.; Cho, S.; Lee, S.; Chang, G.; Jo, Y.; Park, H.; Park, Y., Quantitative Phase Imaging Techniques for the Study of Cell Pathophysiology: From Principles to Applications. *Sensors-Basel* 2013, 13 (4), 4170-4191.
3. Park, Y.; Best, C. A.; Badizadegan, K.; Dasari, R. R.; Feld, M. S.; Kuriabova, T.; Henle, M. L.; Levine, A. J.; Popescu, G., Measurement of red blood cell mechanics during morphological changes. *P Natl Acad Sci USA* 2010, 107 (15), 6731-6736.
4. Majeed, H.; Nguyen, T.; Macias, V.; Tangella, K.; Kajdacsy-Balla, A.; Do, M.; Popescu, G., Towards Automated Histopathology of Breast Cancer Using Spatial Light Interference Microscopy (SLIM). *Modern Pathol* 2016, 29, 55a-56a.
5. Bhaduri, B.; Edwards, C.; Pham, H.; Zhou, R. J.; Nguyen, T. H.; Goddard, L. L.; Popescu, G., Diffraction phase microscopy: principles and applications in materials and life sciences. *Adv Opt Photonics* 2014, 6 (1), 57-119.
6. Edwards, C.; Zhou, R. J.; Hwang, S. W.; McKeown, S. J.; Wang, K. Y.; Bhaduri, B.; Ganti, R.; Yunker, P. J.; Yodh, A. G.; Rogers, J. A.; Goddard, L. L.; Popescu, G., Diffraction phase microscopy: monitoring nanoscale dynamics in materials science [Invited]. *Appl Optics* 2014, 53 (27), G33-G43.
7. Zhou, R. J.; Edwards, C.; Arbabi, A.; Popescu, G.; Goddard, L. L., Detecting 20 nm Wide Defects in Large Area Nanopatterns Using Optical Interferometric Microscopy. *Nano Lett* 2013, 13 (8), 3716-3721.
8. Jafarfard, M. R.; Moon, S.; Tayebi, B.; Kim, D. Y., Dual-wavelength diffraction phase microscopy for simultaneous measurement of refractive index and thickness. *Opt Lett* 2014, 39 (10), 2908-2911.
9. Popescu, G.; Ikeda, T.; Dasari, R. R.; Feld, M. S., Diffraction phase microscopy for quantifying cell structure and dynamics. *Opt Lett* 2006, 31(6), 775-777.
10. Lee, K.; Park, Y., Quantitative phase imaging unit. *Opt Lett* 2014, 39 (12), 3630-3633.
11. Pham, H. V.; Edwards, C.; Goddard, L. L.; Popescu, G., Fast phase reconstruction in white light diffraction phase microscopy. *Appl Optics* 2013, 52 (1), A97-A101.
12. Edwards, C.; Arbabi, A.; Popescu, G.; Goddard, L. L., Optically monitoring and controlling nanoscale topography during semiconductor etching (vol 1, e30, 2012). *Light-Sci Appl* 2012, 1.
13. Park, Y. K.; Best, C. A.; Auth, T.; Gov, N. S.; Safran, S. A.; Popescu, G.; Suresh, S.; Feld, M. S., Metabolic remodeling of the human red blood cell membrane. *P Natl Acad Sci USA* 2010, 107 (4), 1289-1294.
14. Park, Y. K.; Diez-Silva, M.; Popescu, G.; Lykotrafitis, G.; Choi, W. S.; Feld, M. S.; Suresh, S., Refractive index maps and membrane dynamics of human red blood cells parasitized by *Plasmodium falciparum*. *P Natl Acad Sci USA* 2008, 105 (37), 13730-13735.
15. Jin, D.; Sung, Y. J.; Lue, N.; Kim, Y. H.; So, P. T. C.; Yaqoob, Z., Large Population Cell Characterization Using Quantitative Phase Cytometer. *Cytom Part A* 2017, 91a (5), 450-459.

We claim:

1. A system for quantitative phase imaging, the system comprising:
an illuminating source that generates an illuminating beam;
a fiber coupler having an input end coupled to the illuminating source to receive the illuminating beam, configured to provide a first illuminating beam to output from a first output end to propagate along a transmission-mode path and a second illuminating beam to output from a second output end to propagate along a reflection-mode path;

a first linear polarizer disposed in the transmission-mode path to receive the first illuminating beam from the fiber coupler and configured to linearly polarize the first illuminating beam before illuminating a sample;

a second linear polarizer disposed in the reflection-mode path to receive the second illuminating beam from the fiber coupler and configured to linearly polarize the second illuminating beam;

a half-wave plate disposed in the reflection-mode path to receive the second illuminating beam from the second linear polarizer and configured to rotate polarization of the second illuminating beam to about 0 degree along a horizontal axis;

a polarization beam splitter (PBS) disposed in the reflection-mode path to receive the second illuminating beam from the half-wave plate and configured to divide incident elliptically polarized light into orthogonally polarized beams such that a horizontally polarized second illuminating beam is fully directed to an objective lens side;

a quarter-wave plate disposed in the reflection-mode path to receive the second illuminating beam from the PBS and configured to rotate an imaging field polarization state by about 90° along a vertical axis such that the second illuminating beam only goes along a right-hand side port of the PBS before forming an image;

a microscope objective lens disposed in the reflection-mode path to receive the second illuminating beam from the quarter-wave plate and transmit the second illuminating beam to the sample and receive a third illuminating beam formed by the second illuminating beam reflected by the sample; the microscope objective lens being disposed to receive the first illuminating beam propagating from the transmission-mode path and transmitting through the sample for imaging;

a tube lens disposed to receive the third illuminating beam from the microscope objective lens; and a common-path interferometer system disposed to receive the third illuminating beam from the tube lens, the common-path interferometer system comprising:
  a diffraction grating disposed in an intermediate image plane and configured to generate beams of multiple image orders, wherein a $0^{th}$ diffraction order beam is configured to be an imaging beam and a $1^{st}$ diffraction order beam is configured to be a reference beam;
  a Fourier lens disposed to receive both the $0^{th}$ diffraction order beam and the $1^{st}$ diffraction order beam and configured to focus them down by a predetermined focal length;
  a pinhole disposed in the Fourier plane to receive the $1^{st}$ order beam, configured to be a low-pass filter for the $1^{st}$ order beam; and
  a 2f system lens disposed to receive the imaging beam from the Fourier lens and the reference beam from the pinhole, configured to collimate the reference beam and the imaging beam such that the collimated reference beam and the imaging beam interfere with each other to form an interferogram at a final image plane.

2. The system of claim 1, wherein the illuminating source is configured to provide a laser beam of a wavelength of about 633 nm and a maximum output power of about 4.6 mW.

3. The system of claim 1, wherein the fiber coupler is a single mode 1×2 fiber coupler.

4. The system of claim 1, further comprising a coupling lens disposed between the illuminating source and the fiber coupler.

5. The system of claim 1, further comprising a first collimator disposed between the first output end of the fiber coupler and the first linear polarizer for collimating the first illuminating beam from the fiber coupler.

6. The system of claim 1, further comprising a second collimator disposed between the second output end of the fiber coupler and the second linear polarizer for collimating the second illuminating beam from the fiber coupler.

7. The system of claim 1, wherein for the reflection-mode light path, the fiber coupler is configured to expand the illuminating beam to have a diameter of about 10 mm before being linearly polarized.

8. The system of claim 1, further comprising a collector lens disposed between the half-wave plate and the PBS, wherein the collector lens and the microscope objective lens form a 4f system to ensure a uniform and collimated beam illuminating the sample in a field of view.

9. The system of claim 8, wherein after the illuminating beam is reflected off the sample, the imaging field is created that carries structural information of the sample in a phase of the imaging field.

10. The system of claim 1, wherein the half-wave plate, the quarter-wave plate, and the second linear polarizer form an isolator ensuring that the second illuminating beam unidirectionally propagates.

11. The system of claim 1, further comprising a first mirror disposed between the first linear polarizer and the sample to reflect the first illuminating beam to the sample.

12. The system of claim 1, further comprising a second mirror disposed between the tube lens and the diffraction gating to reflect the third illuminating beam to the diffraction gating.

13. The system of claim 1, wherein the diffraction grating is formed with 110 lines per mm (1 pm) gratings.

14. The system of claim 1, wherein the pinhole has a diameter of about 5 μm.

15. The system of claim 1, wherein the 2f system lens has a focal length of about 75 mm.

16. The system of claim 1, wherein the diffraction grating is configured such that the imaging beam travels through centers of the diffraction grating and the 2f system lens to avoid astigmatism in the imaging system.

17. The system of claim 1, further comprising an image capturing device disposed in the final image plane to capture the interferogram from which a phase of the imaging field is retrieved.

18. The system of claim 17, wherein the image capturing device is a camera.

19. The system of claim 1, wherein a predetermined focus length is about 35 mm.

20. The system of claim 1, wherein the fiber coupler is configured to shut off or block the second illuminating beam for the reflection-mode path, when the sample to be imaged is a transparent sample.

21. The system of claim 1, wherein the fiber coupler is configured to shut off or block the first illuminating beam for the transmission-mode path, when the sample to be imaged is a reflective sample.

22. The system of claim 1, wherein the fiber coupler is configured to simultaneously provide both the first illuminating beam for the transmission-mode path and the second illuminating beam for the reflective-mode path, when the sample to be imaged is a semi-transparent sample.

23. A method for obtaining a quantitative phase image of a sample, the method comprising:

generating an illuminating beam by an illuminating source;

splitting the illuminating beam, by a fiber coupler, into a first illuminating beam to propagate along a transmission-mode path and a second illuminating beam to propagate along a reflection-mode path;

linearly polarizing the first illuminating beam by a first linear polarizer disposed in the transmission-mode path;

linearly polarizing the second illuminating beam by a second linear polarizer disposed in the reflection-mode path;

rotating polarization of the second illuminating beam to about 0 degree along a horizontal axis by a half-wave plate disposed in the reflection-mode path to receive the second illuminating beam from the second linear polarizer;

dividing, by a polarization beam splitter (PBS) disposed in the reflection-mode path, the incident elliptically polarized light from the half-wave plate into orthogonally polarized beams such that a horizontally polarized second illuminating beam is fully directed to an objective lens side;

rotating, by a quarter-wave plate, an imaging field polarization state by about 90° along a vertical axis such that the second illuminating beam only goes along a right-hand side port of the PBS before forming an image, wherein the quarter-wave plate is disposed in the reflection-mode path to receive the second illuminating beam from the PBS and configured to;

transmitting, by a microscope objective lens, the second illuminating beam to the sample and receiving a third illuminating beam formed by the second illuminating beam reflected by the sample and the first illuminating beam transmitted through the sample for imaging, wherein the microscope objective lens is disposed in the reflection-mode path to receive the second illuminating beam from the PBS;

receiving, by a tube lens, the third illuminating beam from the PBS and providing the third illuminating beam for the common-path interferometry; and performing a common-path interferometry by:

generating beams of multiple image orders by a diffraction grating disposed in an intermediate image plane, wherein a $0^{th}$ diffraction order beam is configured to be an imaging beam and a $1^{st}$ diffraction order beam is configured to be a reference beam;

focusing, by a Fourier lens, both the $0^{th}$ diffraction order beam and the $1^{st}$ diffraction order beam down by a predetermined focal length;

low-pass filtering for the $1^{st}$ order beam by a pinhole disposed in the Fourier plane; and collimating, by a 2f system lens, the reference beam and the imaging beam such that the collimated reference beam and the imaging beam interfere with each other to form an interferogram at a final image plane, the 2f system lens being disposed to receive the imaging beam from the Fourier lens and the reference beam from the pinhole.

* * * * *